Feb. 22, 1955  G. R. DEMPSTER  2,702,721
CONTAINER FOR TRANSPORTING AND DUMPING DEVICES
Filed Nov. 3, 1949  5 Sheets-Sheet 1
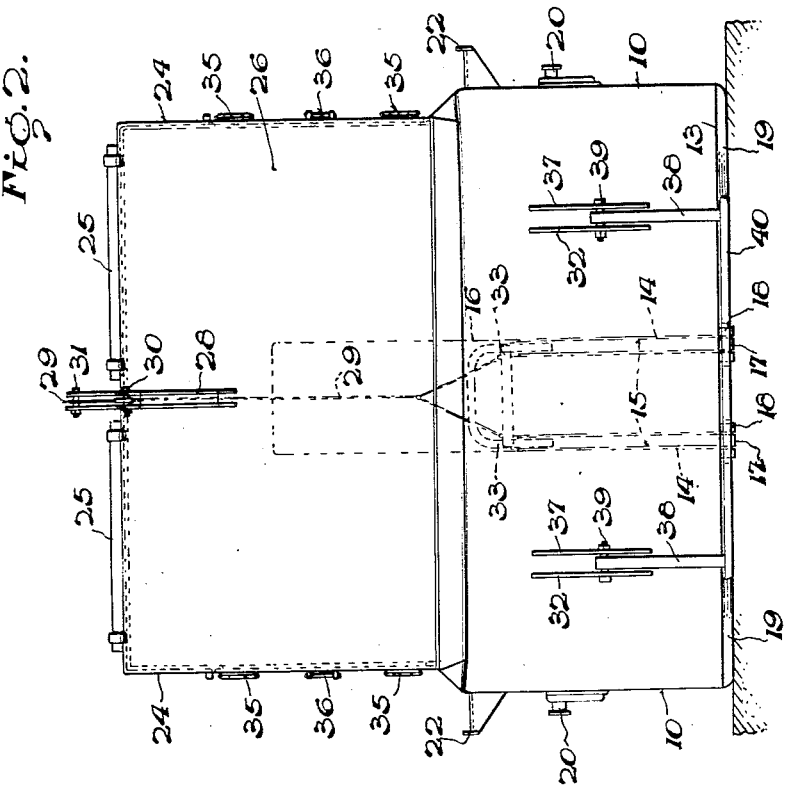
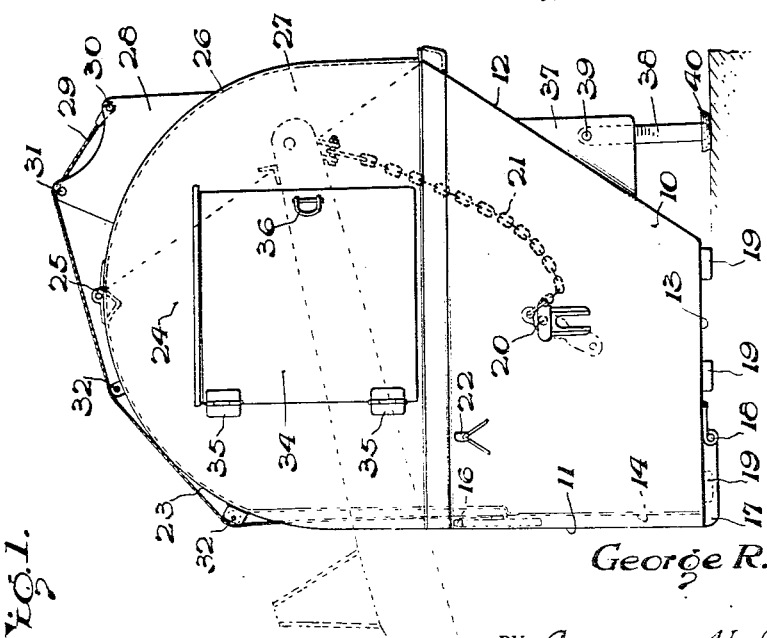
INVENTOR
George R. Dempster.
BY Cameron, Kerkam + Sutton
ATTORNEYS

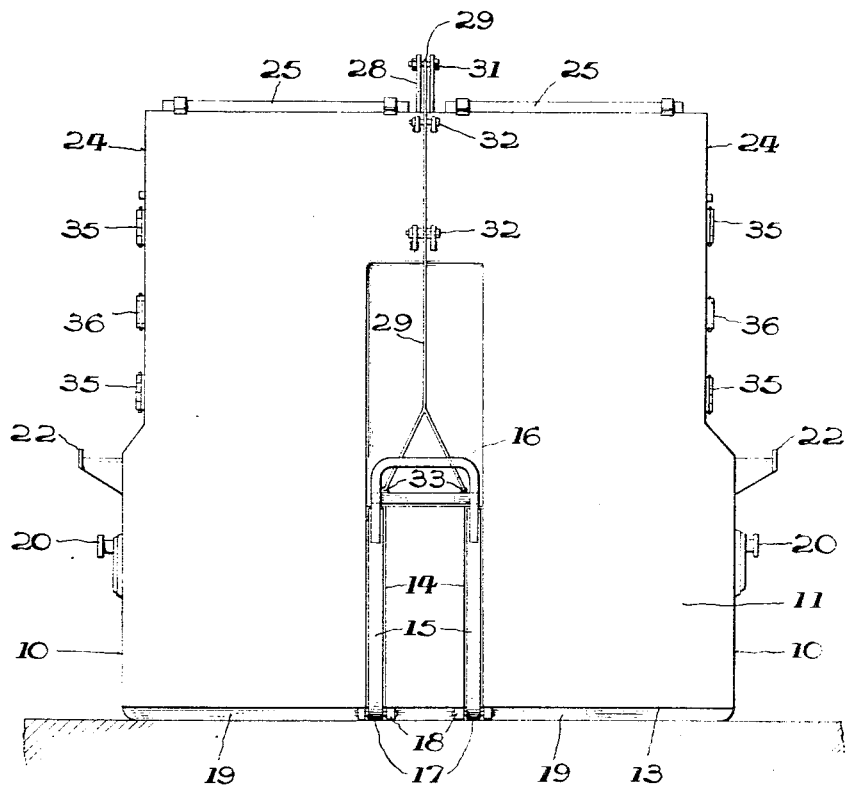

Feb. 22, 1955 G. R. DEMPSTER 2,702,721
CONTAINER FOR TRANSPORTING AND DUMPING DEVICES
Filed Nov. 3, 1949 5 Sheets-Sheet 3

INVENTOR
George R. Dempster
BY
Cameron, Kerkam + Sutton ATTORNEYS

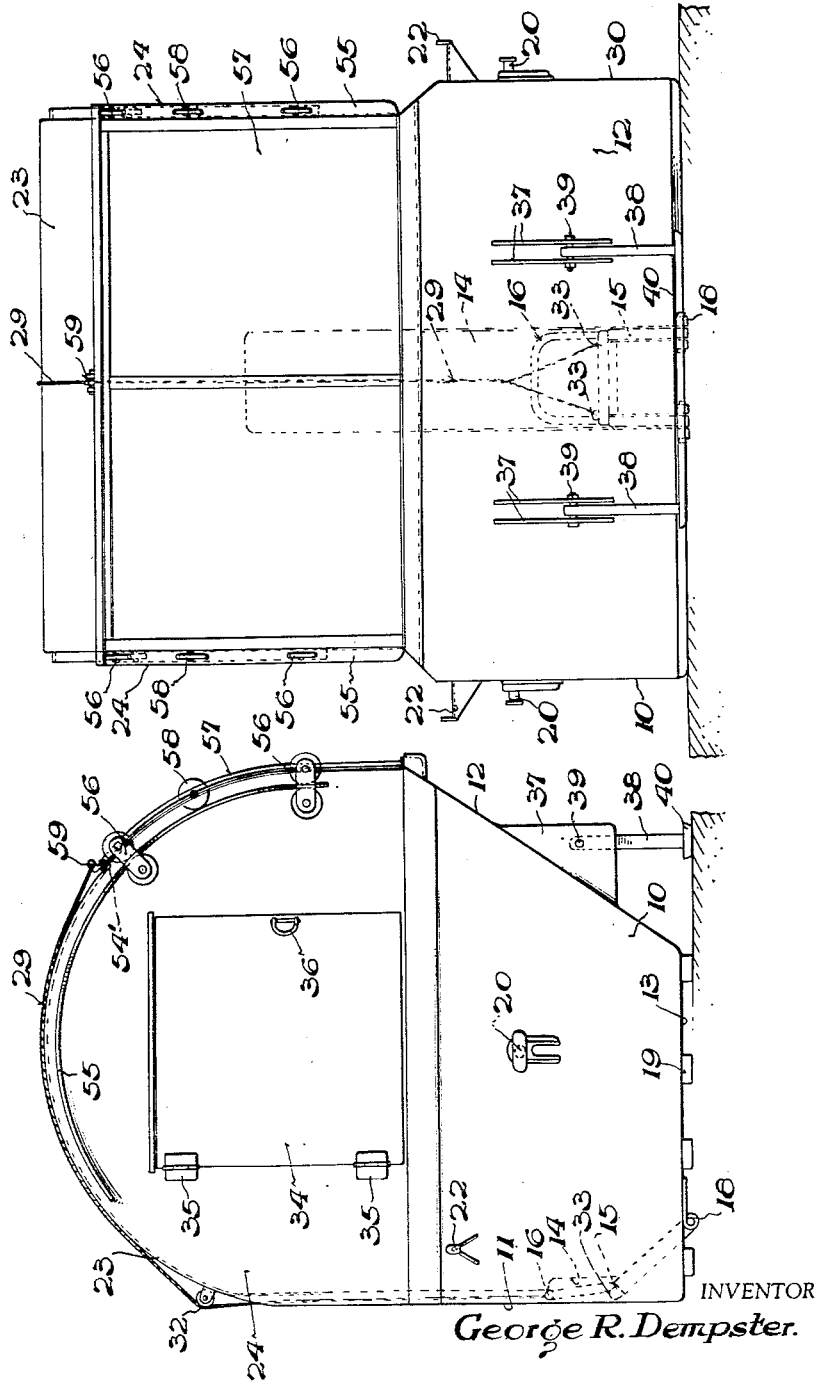

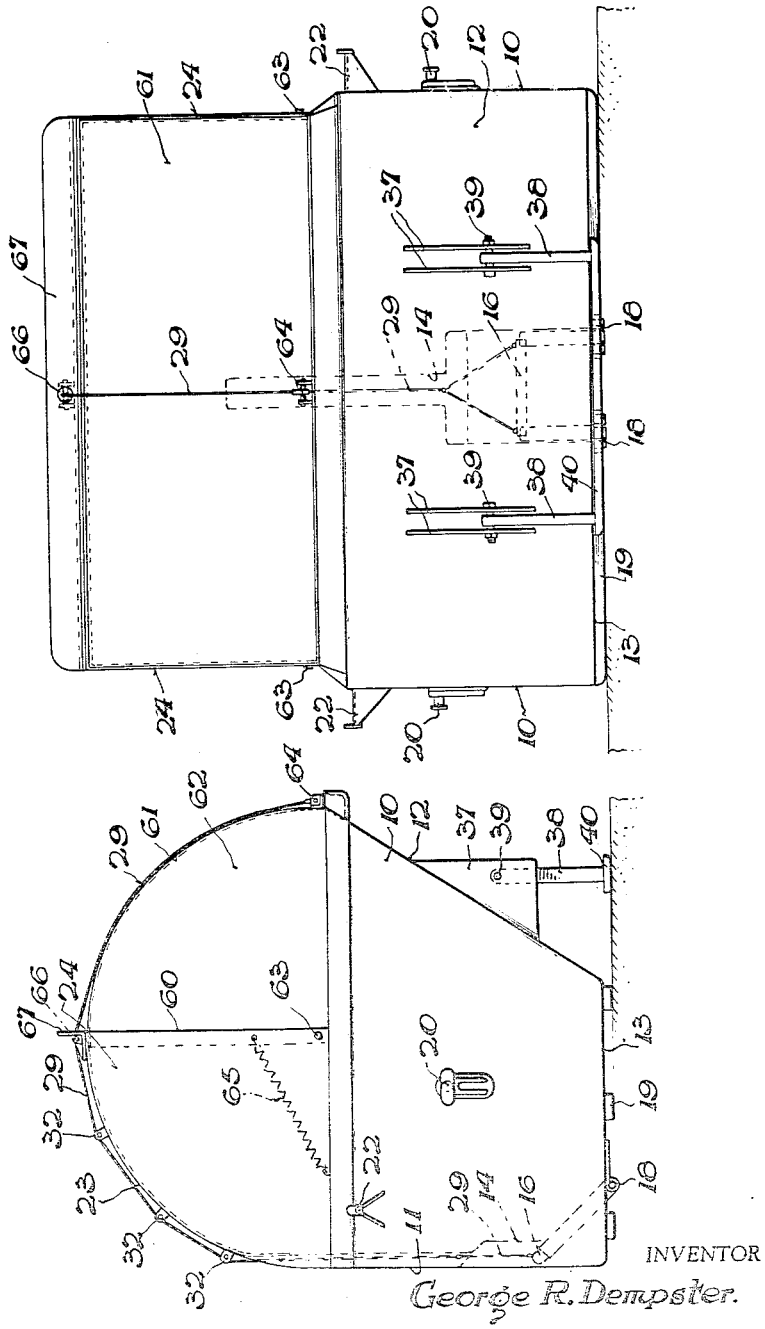

United States Patent Office 2,702,721
Patented Feb. 22, 1955

2,702,721

CONTAINER FOR TRANSPORTING AND DUMPING DEVICES

George R. Dempster, Knoxville, Tenn.

Application November 3, 1949, Serial No. 125,336

9 Claims. (Cl. 294—73)

This invention relates to containers for transporting and dumping devices and more particularly to such containers suitable for use with transporting and dumping devices such as those disclosed in my United States Patents Nos. 2,179,779 and 2,281,183 and others.

More particularly still this invention relates to such containers which are leak-proof and covered so that they may be used to transport, store and dump malodorous liquid or, semi-liquid or wet loads such as garbage, refuse and the like.

More particularly still this invention relates to such containers which are covered and in which the cover is automatically lifted or opened during the dumping of the container to permit the contents thereof to be dumped.

Heretofore various containers have been proposed for the handling of malodorous loads and certain of these containers have been provided with removable covers to facilitate loading and dumping of the same. In containers of any substantial size these covers become large and heavy and complicate the loading and dumping of the container. I have, for the first time, by the present invention provided a novel container of the type generally referred to particularly suitable for use with my transporting and dumping devices in which the cover is automatically lifted or opened during the dumping operation to permit discharge of the load from the container.

It is accordingly an object of the present invention to provide a novel container particularly suited for transporting and dumping malodorous loads in which the container is leak-proof and is provided with a cover which is normally closed and which is automatically opened during the dumping operation.

Another object of the present invention is to provide such a container which is provided with legs to support the same while resting upon the ground which legs are so constructed that they will rotate freely when the container is being dumped so as not to interfere with the dumping of the container.

Another object is to provide such containers which are of large capacity, relatively inexpensive to manufacture and which may be left at collection points until loaded.

Other and further objects of the present invention will appear from the following description thereof.

The novel containers of the present invention are capable of various mechanical embodiments three of which are shown in the accompanying drawings and will be described hereinafter in detail to illustrate this invention. These illustrative embodiments of my invention should in no way be construed as defining or limiting the same and reference should be had to the appended claims for this purpose.

In the accompanying drawings, in which like reference characters indicate like parts, Fig. 1 is a side view of one embodiment of the present invention showing the container resting upon the ground with the supporting legs in position and with its cover closed;

Fig. 2 is a front view of the embodiment of Fig. 1 as seen from the right therein;

Fig. 2a is a rear view of the embodiment of Fig. 1 as seen from the left therein;

Fig. 4 is a side view of another embodiment of the novel container of the present invention;

Fig. 5 is a front view of the embodiment of Fig. 4 as seen from the right therein;

Fig. 6 is a side view of another embodiment of the novel container of the present invention; and Fig. 7 is a front view of the embodiment of Fig. 6 as seen from the right therein.

Figure 3:
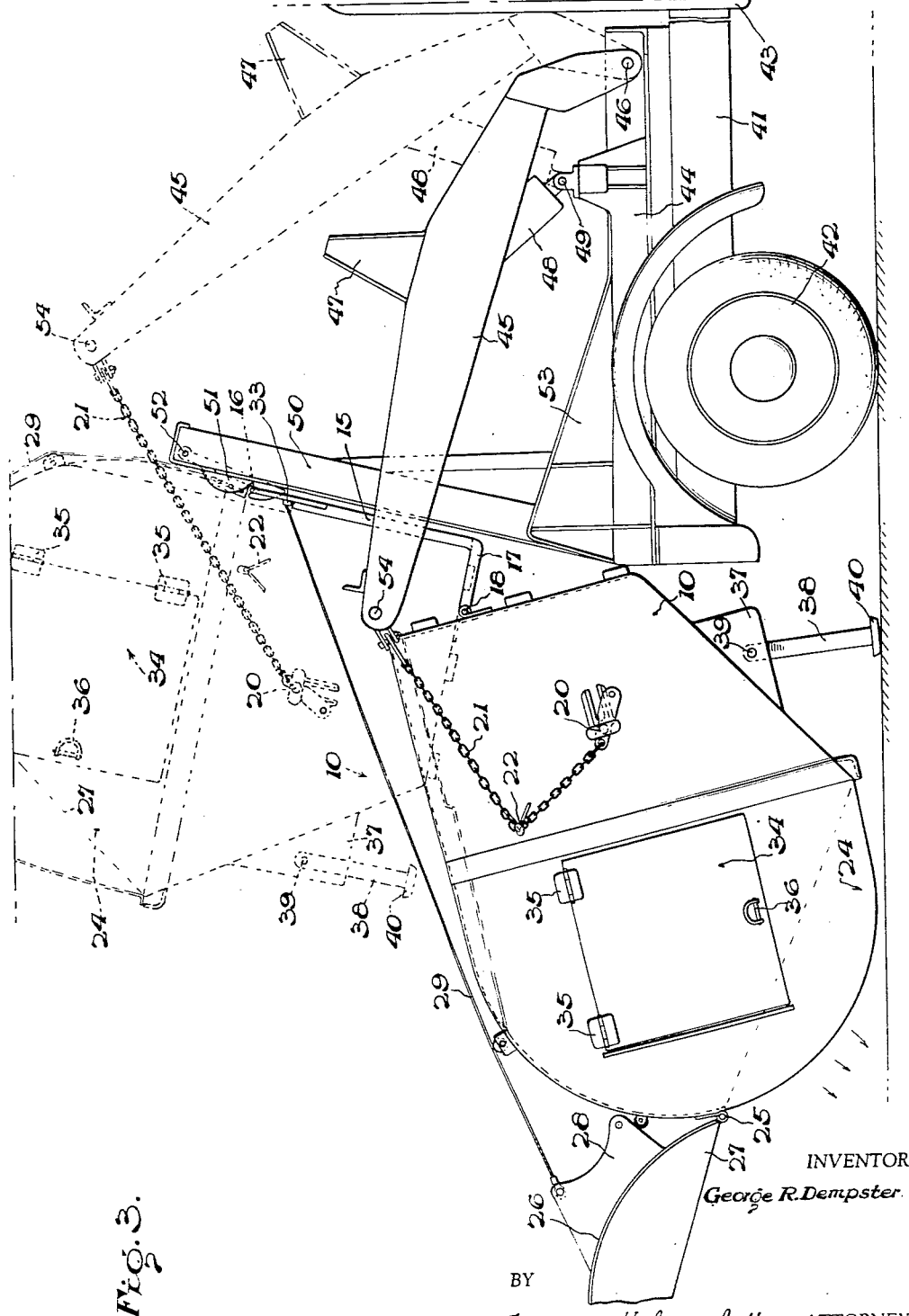
Fig. 3 is a side view of a transporting and dumping device as disclosed in my prior patents transporting and dumping the embodiment of my novel container of Fig. 1.

Referring now more particularly to Figs. 1, 2 and 3 the novel container there shown comprises two side walls 10, a rear wall 11, an upwardly and outwardly sloping front wall 12 and a bottom 13. Rear wall 11 is provided with vertically disposed grooves 14 designed to receive the parallel arms 15 of the bail 16. Arms 15 of bail 16 are inwardly turned as at 17 and are pivoted at 18 to the bottom 13 of the container. Bottom 13 is provided with reinforcing members 19 to reinforce and to support the container when on the ground. As is readily apparent, bail 16 is so arranged with respect to pivot 18 that when the container is on the ground the weight of the container is disposed upon the reinforcing members 19 and upon the portions 17 of the bail 16. By this arrangement bail 16 is always secured in raised position with arms 15 in grooves 14 when the container is on the ground. Suitable lugs 20 are provided on sides 10 of the container to receive the chains 21 of the transporting and dumping vehicle for elevating and transporting and dumping the container. The container is likewise provided with deflecting pins 22 on side walls 10 disposed above lugs 20 and toward rear wall 11. Deflecting pins 22 are provided to engage the chains 21 when the container is in dumping position to provide chains 21 with a better leverage for raising the container after its contents have been dumped.

The container as defined by side walls 10, rear wall 11, front wall 12 and bottom 13 is provided with a cover having a curved rear and partial top wall 23 and side walls 24. The cover defined by curved rear and top wall 23 and side walls 24 is secured to the balance of the container as by welding or other suitable means. A hinge 25 extends along the front edge of wall 23 and a curved door 26 having sides 27 is mounted on hinge 25. Sides 27 fit within sides 24 when door 56 is closed. Door 26 is provided with an upstanding comb 28 to which is secured a tiller rope 29, as at 30, and tiller rope 29 passes over upstanding portion 31 of comb 28 to provide better leverage for opening door 26. Tiller rope 29 passes over suitable rollers 32 mounted on wall 23 and is secured to bail 16 at 33. As will appear more fully hereinafter, when the container thus defined is dumped the container rotates about pivot 18 with bail 16 remaining more or less fixed in position and this rotation of the container acting through tiller rope 29 rotates door 26 in a counter-clockwise direction as seen in Fig. 1 to open the same to permit dumping of the contents of the container.

Suitable loading doors 34 may be provided in sides 24. Doors 34 are provided with hinges 35 and suitable latches 36 so that the same may be readily opened for the purpose of loading the container.

Upwardly and outwardly extending front wall 12 is provided with pairs of downwardly extending brackets 37 in which legs 38 are pivotally mounted at 39. Legs 38 may be provided with a common shoe 40, if desired. Legs 38 being pivoted at 39 to brackets 37 assume vertical positions under the action of gravity so that when the container is placed upon the ground shoe 40 will engage the ground and to support and to prevent the container from upsetting. When the container is being dumped, as will be seen in Fig. 3, legs 38 rotate about pivots 39 in a vertical plane under the action of gravity to prevent legs 38 from engaging rear end of the transporting and dumping vehicle and from impairing the dumping action of the container.

Fig. 3 is a side view of a transporting and dumping vehicle as disclosed in my several patents as identified above showing the container just described in elevated and in dumping positions. The transporting and dumping vehicle includes a suitable vehicle chassis 41 provided with rear wheels 42 and having a driving compartment or cab 43. A sub-chassis 44 is mounted on chassis 41 and has booms 45 pivoted at the forward end thereof at 46. Booms 45 are cross-connected by a frame 47 and a suitable piston and cylinder 48 are pivotally mounted to sub-chassis 44 at 49 and are connected to frame 47 for raising and lowering booms 45. A skid frame 50 is mounted for reciprocating movement in sub-frame 44 and is moved fore and aft along sub-frame 44 by a hydraulically powered piston and cylinder not shown. A hook 51 is pivotally mounted at 52 in the top of skid frame 50.

Incline surfaces 53 are provided on sub-frame 44 to assist in holding the container in transporting position, as disclosed in my prior patents.

Chains 21 are pivotally secured to the outer ends of booms 45 at 54 and chains 21 engage lugs 20 on the sides 10 of the container.

When chains 21 are engaged with lugs 20 and booms 45 are raised the container will be elevated along the face of skid frames 50 until bail 16 engages hook 51, in known manner, and thereafter when booms 45 are lowered the container will rotate in a counterclockwise direction as seen in Fig. 3 about pivot 18. Counterclockwise rotation of the container about pivot 18 rotates door 26 in a clockwise direction, as seen in Fig. 3, since tiller rope 29 is secured to bail 16 at point 33 which is now in more or less fixed position adjacent hook 51. Rotation of door 26 in a clockwise direction opens the top of the container and continued rotation of the container in a counterclockwise direction dumps the contents of the same. Meanwhile legs 38 have rotated around pivots 39 under the action of gravity so that the same will not engage the rear of the chassis 41 and impair the dumping of the container. As counterclockwise rotation of the container continues chains 21 engage deflecting pins 22 to provide better leverage for rotating the containers in a clockwise direction about pivots 18 when the dumping of the container is completed and booms 45 are subsequently raised.

The embodiment of the container of the present invention shown in Figs. 4 and 5 includes a lower container portion similar to that shown in Figs. 1, 2 and 3 including side walls 10 upwardly and outwardly extending front wall 12, rear wall 11 and bottom 13. Bottom 13 is reinforced by reinforcing members 19 and side walls 10 carry lugs 18 and deflecting pins 22. Rear wall 11 is channeled at 14 to receive bail 16 and bail 16 is pivoted at 18 to bottom 13. The cover for the container thus defined includes a curved rear and partial upper wall 23 which terminates on line 54′ and is provided with side walls 24 having curved upper edges. Curved tracks 55 are secured adjacent the upper edges of side walls 24. Pairs of rollers 56 engage opposite surfaces of track 55 and a sliding door 57 is secured to these rollers. Intermediate rollers 58 may be secured to cover 57 to engage the upper surface of track 55. Tiller rope 29 is secured at 59 to cover 57 and passes over suitable rollers 32 carried by wall 23. Tiller rope 29 engages bail 16 at 33.

Upwardly and outwardly extending front wall 12 is provided with brackets 37 between which legs 38 are pivoted at 39 and legs 38 may be provided with a common shoe 40. Side walls 24 may be provided with any suitable loading door 34 hinged thereto at 35 and provided with suitable latch 36 so that the same may be readily opened to load the container.

In this embodiment of the present invention when the bail 16 is engaged upon hook 51 and booms 45 are lowered the container rotates about pivot 18 and since tiller rope 29 is fixed at 33 adjacent hook 51, door 57 will be slid over wall 23, rollers 56 and 58 moving along track 55, to open the top of the container to permit dumping of the load. When the container is dumped and booms 45 are raised the container will rotate about pivot 18 into vertical position and the weight of door 57 will move the same into closed position.

The embodiment of the novel container of the present invention shown in Figs. 6 and 7 is of similar structure to those of Figs. 1, 2 and 3 and Figs. 4 and 5 except that side walls 24 terminate in vertically disposed edges 60. The door 61 has similar curvature to wall 23 and is provided with sides 62 which are pivoted at 63 to sides 24. Tiller rope 29 is secured at the lower edge of cover 61 at 64 and passes through hole 66 in reinforcing and stop member 67 which is secured across the front edge of wall 23. Thus when the container is rotated about pivot 18 tiller rope 29 will rotate cover 61 inside of wall 23 and sides 62 will rotate within sides 24 to open the container for dumping.

Door 61 and sides 62 may be connected to suitable springs 65 which are in turn secured to walls 10. Springs 65 are so arranged that they will be under tension when door 61 is closed to facilitate manual opening of door 61 to load the container.

It will now be apparent to those skilled in the art that by the present invention I have provided novel closed containers suitable for the transporting of wet and malodorous loads and which open automatically upon rotation of the container into dumping position to permit dumping of the contents thereof. It should also now be obvious that my novel containers in every way satisfy the above defined objects.

Changes in or modifications to the above described illustrative embodiments of my invention may now be suggested to those skilled in the art without departing from my inventive concept. Reference should therefore be had to the appended claims to determine the scope of this invention.

What is claimed is:

1. In a container including a bottom, side and rear walls, an upwardly and outwardly extending front wall, a pivot secured to the bottom spaced from and parallel to the rear wall, a bail engaging the pivot extending along the bottom and along the rear wall and recesses in the rear wall to receive the bail, a cover for the container, a door for said cover and a tiller rope secured to said door and to the bail whereby when said container is rotated about the pivot the tiller rope will open said door.

2. A container as described in claim 1 including brackets secured to the upwardly and outwardly extending front wall and legs pivoted in said brackets supporting said container only when said container is resting on its bottom.

3. A container as described in claim 1 in which said cover includes upstanding side walls, a curved rear wall and partial top, a door hinged along the front edge of said partial top and an upstanding comb carried by said door to which said tiller rope is secured.

4. A container as defined in claim 3 including brackets secured to the upwardly and outwardly extending wall and legs pivoted in said brackets supporting said container only when said container is resting on its bottom.

5. A container as described in claim 1 in which said cover includes upwardly extending side walls having curved upper edges, a rear wall following the curvature of the upper edges of said side walls and terminating adjacent the highest point thereof, a curved door closing the remainder of the space between said side walls, curved tracks extending parallel to the edges of said side walls carried by said side walls and rollers engaging said tracks and carried by said curved door, said tiller rope being secured to the upper edge of said curved door whereby when said container is dumped said curved door will ride over said curved rear wall along said tracks.

6. A container as described in claim 5 including brackets secured to the upwardly and outwardly extending front wall and container supporting legs pivotally mounted in said brackets.

7. A container as described in claim 1 in which said cover includes fixed upwardly extending side walls terminating in vertical edges, a curved rear wall secured to said upstanding side walls and terminating in the plane of said vertical edges, and a door including a curved member having side walls secured thereto and pivoted to said side walls of said cover adjacent the lower extremities of said vertical edges and rotatable about said pivots within said curved rear wall and said vertical side walls of said cover, said tiller rope being secured to the lowest extremity of said door.

8. A container as described in claim 7 in which said upwardly and outwardly extending front wall includes brackets secured thereto and container supporting legs pivotally mounted in said brackets.

9. In a container including bottom, side and rear walls, a front wall, a partial top, a pivot secured to the bottom, and a bail engaging the pivot extending along the bottom and along the rear wall, a door completing the top of the container, and a flexible non-extensible member secured at one end to said door and secured at its other end to said bail passing over the partial top of the container whereby when the container is rotated about the pivot said door will be opened.

References Cited in the file of this patent

UNITED STATES PATENTS

| | | |
|---|---|---|
| 1,075,926 | McGhee et al. | Oct. 14, 1913 |
| 1,106,523 | Streich | Aug. 11, 1914 |
| 1,612,223 | Robinson | Dec. 28, 1926 |
| 2,085,029 | Lambert | June 29, 1937 |
| 2,130,951 | Edwards | Sept. 20, 1938 |
| 2,179,779 | Dempster | Nov. 14, 1939 |
| 2,264,216 | Milligan | Nov. 25, 1941 |
| 2,281,183 | Dempster | Apr. 28, 1942 |
| 2,316,826 | Wachter | Apr. 20, 1943 |
| 2,330,614 | Ochsner | Sept. 28, 1943 |
| 2,369,722 | Dempster | Feb. 20, 1945 |

FOREIGN PATENTS

| | | |
|---|---|---|
| 781,758 | France | Mar. 4, 1935 |
| 377,836 | Italy | Jan. 10, 1940 |